(12) United States Patent
Nagashima et al.

(10) Patent No.: US 11,448,286 B2
(45) Date of Patent: Sep. 20, 2022

(54) VIBRATION-DAMPING DEVICE

(71) Applicant: Prospira Corporation, Kawasaki (JP)

(72) Inventors: Yasuyuki Nagashima, Tokyo (JP); Yuki Satake, Tokyo (JP); Akira Ueki, Tokyo (JP)

(73) Assignee: Prospira Corporation, Kawasaki (JP)

( * ) Notice: Subject to any disclaimer, the term of this patent is extended or adjusted under 35 U.S.C. 154(b) by 42 days.

(21) Appl. No.: 16/607,124

(22) PCT Filed: Jan. 12, 2018

(86) PCT No.: PCT/JP2018/000662
§ 371 (c)(1),
(2) Date: Oct. 22, 2019

(87) PCT Pub. No.: WO2018/198442
PCT Pub. Date: Nov. 1, 2018

(65) Prior Publication Data
US 2020/0300331 A1 Sep. 24, 2020

(30) Foreign Application Priority Data
Apr. 27, 2017 (JP) .............................. JP2017-088247

(51) Int. Cl.
*F16F 13/10* (2006.01)

(52) U.S. Cl.
CPC .................................. *F16F 13/107* (2013.01)

(58) Field of Classification Search
CPC ...... F16F 13/107; F16F 13/105; F16F 13/007; F16F 13/102; F16F 13/1463; F16F 1/377; F16F 2222/12
See application file for complete search history.

(56) References Cited

U.S. PATENT DOCUMENTS

| 2,893,432 | A | * | 7/1959 | Gibson | ................. F16L 55/027 138/26 |
| 3,323,550 | A | * | 6/1967 | Lee, II | ..................... F15C 1/16 138/39 |

(Continued)

FOREIGN PATENT DOCUMENTS

| FR | 2714947 B1 | 3/1996 |
| JP | 57-118921 A | 7/1982 |

(Continued)

OTHER PUBLICATIONS

Communication dated Aug. 31, 2020 from the State Intellectual Property Office of the P.R.C. in Application No. 201880026783.7.

(Continued)

*Primary Examiner* — Robert A. Siconolfi
*Assistant Examiner* — Mahbubur Rashid
(74) *Attorney, Agent, or Firm* — Kenja IP Law PC

(57) ABSTRACT

A restricted passage (24) of the present invention includes a first communication part (26) which is open to a first liquid chamber, a second communication part (27) which is open to a second liquid chamber, and a main body flow path (25) which allows the first communication part (26) and the second communication part (27) to communicate with each other, the main body flow path (25) includes a swirl chamber (34) that generates a swirling flow of the liquid according to a flow velocity of the liquid from the other of the first communication part (26) and the second communication part (27), and the swirl chamber (34) is disposed to be spaced apart from one of the first ID communication part (26) and the second communication part (27).

5 Claims, 3 Drawing Sheets

(56) References Cited

U.S. PATENT DOCUMENTS

| | | | | |
|---|---|---|---|---|
| 4,226,368 A * | 10/1980 | Hunter | A01G 25/023 | 239/542 |
| 4,316,580 A * | 2/1982 | Bodai | F23D 11/34 | 239/466 |
| 4,347,983 A * | 9/1982 | Bodai | B01F 5/0057 | 239/466 |
| 4,407,397 A * | 10/1983 | Fukushima | F16F 9/344 | 188/282.8 |
| 4,442,925 A * | 4/1984 | Fukushima | F16F 9/344 | 188/282.5 |
| 4,466,462 A * | 8/1984 | Morris | F16L 55/02736 | 138/40 |
| 4,466,514 A * | 8/1984 | Molders | F16F 9/3405 | 188/320 |
| 4,515,252 A * | 5/1985 | Hidaka | F16F 9/344 | 137/512.1 |
| 4,552,178 A * | 11/1985 | Olsson | F16J 15/40 | 137/269 |
| 4,660,812 A * | 4/1987 | Dan | F16F 13/26 | 267/140.13 |
| 4,681,306 A * | 7/1987 | Hofmann | F16F 13/262 | 188/139 |
| 4,721,292 A * | 1/1988 | Saito | F16F 13/105 | 180/312 |
| 4,811,934 A * | 3/1989 | Bebermeier | F16F 9/344 | 188/320 |
| 4,909,490 A | 3/1990 | De Fontenay | | |
| 5,020,782 A * | 6/1991 | Freudenberg | F16F 13/106 | 180/312 |
| 5,499,799 A * | 3/1996 | Kojima | F16F 13/107 | 267/140.13 |
| 5,505,229 A * | 4/1996 | Lee, II | F15D 1/00 | 138/40 |
| 6,158,724 A * | 12/2000 | Takashima | F16F 13/103 | 267/140.13 |
| 6,224,045 B1 * | 5/2001 | Muramatsu | F16F 13/106 | 267/140.11 |
| 6,267,362 B1 * | 7/2001 | Satori | F16F 13/103 | 267/140.13 |
| 6,311,964 B1 * | 11/2001 | Suzuki | F16F 13/268 | 267/140.13 |
| 6,505,822 B1 * | 1/2003 | Yamamoto | F16F 13/106 | 267/140.13 |
| 6,523,814 B2 * | 2/2003 | Kodama | F16F 13/105 | 267/140.13 |
| 6,536,113 B2 * | 3/2003 | Guillemot | F16F 13/107 | 267/140.13 |
| 6,634,628 B2 * | 10/2003 | Takashima | F16F 13/105 | 267/140.13 |
| 6,698,732 B2 * | 3/2004 | Takashima | F16F 13/105 | 267/140.13 |
| 7,520,661 B1 * | 4/2009 | Lawson | B01F 5/0604 | 138/42 |
| 7,802,777 B2 * | 9/2010 | Katayama | F16F 13/107 | 267/140.13 |
| 8,454,002 B2 * | 6/2013 | Nishi | F16F 13/107 | 267/140.13 |
| 8,651,467 B2 * | 2/2014 | Ishikawa | B60K 5/1208 | 267/140.13 |
| 8,783,668 B2 * | 7/2014 | Ishikawa | F16F 13/107 | |
| 9,074,654 B2 * | 7/2015 | Ueki | F16F 13/262 | |
| 9,212,720 B2 * | 12/2015 | Satori | F16F 13/10 | |
| 9,597,732 B2 * | 3/2017 | Lewis | B33Y 80/00 | |
| 9,772,003 B2 * | 9/2017 | Ueki | F16F 13/107 | |
| 9,939,038 B2 * | 4/2018 | Ueki | B60K 5/1208 | |
| 2006/0066016 A1 * | 3/2006 | Hasegawa | F16F 13/106 | 267/140.13 |
| 2007/0138718 A1 * | 6/2007 | Muraoka | F16F 13/268 | 267/140.14 |
| 2009/0283945 A1 * | 11/2009 | Kojima | F16F 13/18 | 267/140.13 |
| 2010/0213650 A1 * | 8/2010 | Katayama | F16F 13/106 | 267/118 |
| 2011/0024960 A1 * | 2/2011 | Bradshaw | F16F 13/262 | 267/140.13 |
| 2012/0049423 A1 * | 3/2012 | Ishikawa | F16F 13/106 | 267/140.13 |
| 2012/0299229 A1 * | 11/2012 | Kubo | F16F 13/106 | 267/140.13 |
| 2013/0069289 A1 * | 3/2013 | Ishikawa | F16F 13/106 | 267/140.13 |
| 2013/0292889 A1 * | 11/2013 | Power | F16F 13/107 | 267/140.13 |
| 2016/0102728 A1 * | 4/2016 | Ueki | F16F 13/107 | 267/140.13 |
| 2016/0131219 A1 * | 5/2016 | Ueki | F16F 13/08 | 267/140.13 |
| 2016/0160956 A1 * | 6/2016 | Ueki | B60K 5/1208 | 267/140.13 |
| 2016/0245364 A1 * | 8/2016 | Ueki | F16F 13/107 | |
| 2016/0298716 A1 * | 10/2016 | Ueki | F16F 13/10 | |
| 2017/0030428 A1 * | 2/2017 | Ueki | F16F 13/107 | |
| 2017/0089421 A1 * | 3/2017 | Ueki | F16F 13/107 | |

FOREIGN PATENT DOCUMENTS

| | | | |
|---|---|---|---|
| JP | 63-308245 A | | 12/1988 |
| JP | 03288036 A | * | 12/1991 |
| JP | 2003-148548 A | | 5/2003 |
| JP | 2008-69905 A | | 3/2008 |
| JP | 2008-248967 A | | 10/2008 |
| JP | 2012-172832 A | | 9/2012 |
| WO | 2014/196520 A1 | | 12/2014 |
| WO | 2014196382 A1 | | 12/2014 |

OTHER PUBLICATIONS

International Search Report for PCT/JP2018/000662 dated Mar. 13, 2018 [PCT/ISA/210].

Extended European Search Report dated Dec. 22, 2020 from the European Patent Office in Application No. 18791124.3.

* cited by examiner

VIBRATION-DAMPING DEVICE

CROSS REFERENCE TO RELATED APPLICATIONS

This application is a National Stage of International Application No. PCT/JP2018/000662 filed Jan. 12, 2018, claiming priority based on Japanese Patent Application No. 2017-088247 filed Apr. 27, 2017, the content of which is incorporated herein by reference.

TECHNICAL FIELD

The present invention relates to a vibration-damping device which is applied to, for example, an automobile, an industrial machine, or the like, and absorbs and attenuates vibrations of a vibration-generating unit such as an engine.

BACKGROUND ART

As this type of vibration-damping device, conventionally, a configuration including a cylindrical first mounting member connected to one of a vibration-generating unit and a vibration-receiving unit, a second mounting member connected to the other thereof, an elastic body connecting the mounting members, and a partition member which partitions a liquid chamber in the first mounting member in which a liquid is sealed into a main liquid chamber and a sub liquid chamber is known. A restricted passage that allows the main liquid chamber and the sub liquid chamber to communicate with each other is formed in the partition member. In the vibration-damping device, at the time of vibration input, the mounting members are displaced relative to each other while elastically deforming the elastic body, a liquid pressure of the main liquid chamber changes to cause the liquid to flow in the restricted passage, and thereby the vibration is absorbed and attenuated.

Incidentally, in this vibration-damping device, for example, when a large load (vibration) is input due to unevenness of a road surface or the like, the liquid pressure in the main liquid chamber rises rapidly, and then a load in a reverse direction is input due to rebound of the elastic body or the like, and the main liquid chamber may rapidly gain a negative pressure. Then, due to this rapidly gained negative pressure, cavitation in which a large number of bubbles are generated may occur in the liquid, and further, abnormal noise may occur due to cavitation collapse in which the generated bubbles collapse.

Therefore, for example, as in the case of the vibration-damping device described in Patent Literature 1 below, a configuration in which gaining of the negative pressure in the main liquid chamber is suppressed even when vibrations of a large amplitude are input by providing a valve body in the restricted passage is known.

CITATION LIST

Patent Literature

[Patent Literature 1]
Japanese Unexamined Patent Application, First Publication No. 2012-172832

SUMMARY OF INVENTION

Technical Problem

However, in the above-described conventional vibration-damping device, by providing a valve body, the structure becomes complicated and tuning of the valve body is required, and thus there is a problem in that manufacturing costs increase. Also, by providing the valve body, the degree of freedom in design may be reduced, and as a result, there is a possibility of the vibration-damping characteristics deteriorating.

The present invention has been made in view of the above circumstances, and an objective of the present invention is to provide a vibration-damping device in which generation of abnormal noise due to cavitation collapse can be suppressed with a simple structure without vibration-damping characteristics deteriorating.

Solution to Problem

The vibration-damping device of a liquid-sealed type according to the present invention includes a cylindrical first mounting member connected to one of a vibration-generating unit and a vibration-receiving unit and a second mounting member connected to the other thereof, an elastic body elastically connecting the first and second mounting members, and a partition member which partitions a liquid chamber in the first mounting member in which a liquid is sealed into a first liquid chamber and a second liquid chamber, in which a restricted passage is formed in the partition member to allow the first liquid chamber and the second liquid chamber to communicate with each other, the restricted passage includes a first communication part which is open to the first liquid chamber, a second communication part which is open to the second liquid chamber, and a main body flow path which allows the first communication part and the second communication part to communicate with each other, the main body flow path includes a swirl chamber that generates a swirling flow of the liquid according to a flow velocity of the liquid from the other of the first communication part and the second communication part, and the swirl chamber is disposed to be spaced apart from one of the first communication part and the second communication part.

Effects of Invention

According to the present invention, generation of abnormal noise due to cavitation collapse can be suppressed with a simple structure without vibration-damping characteristics deteriorating.

DESCRIPTION OF EMBODIMENTS

Figure 2:
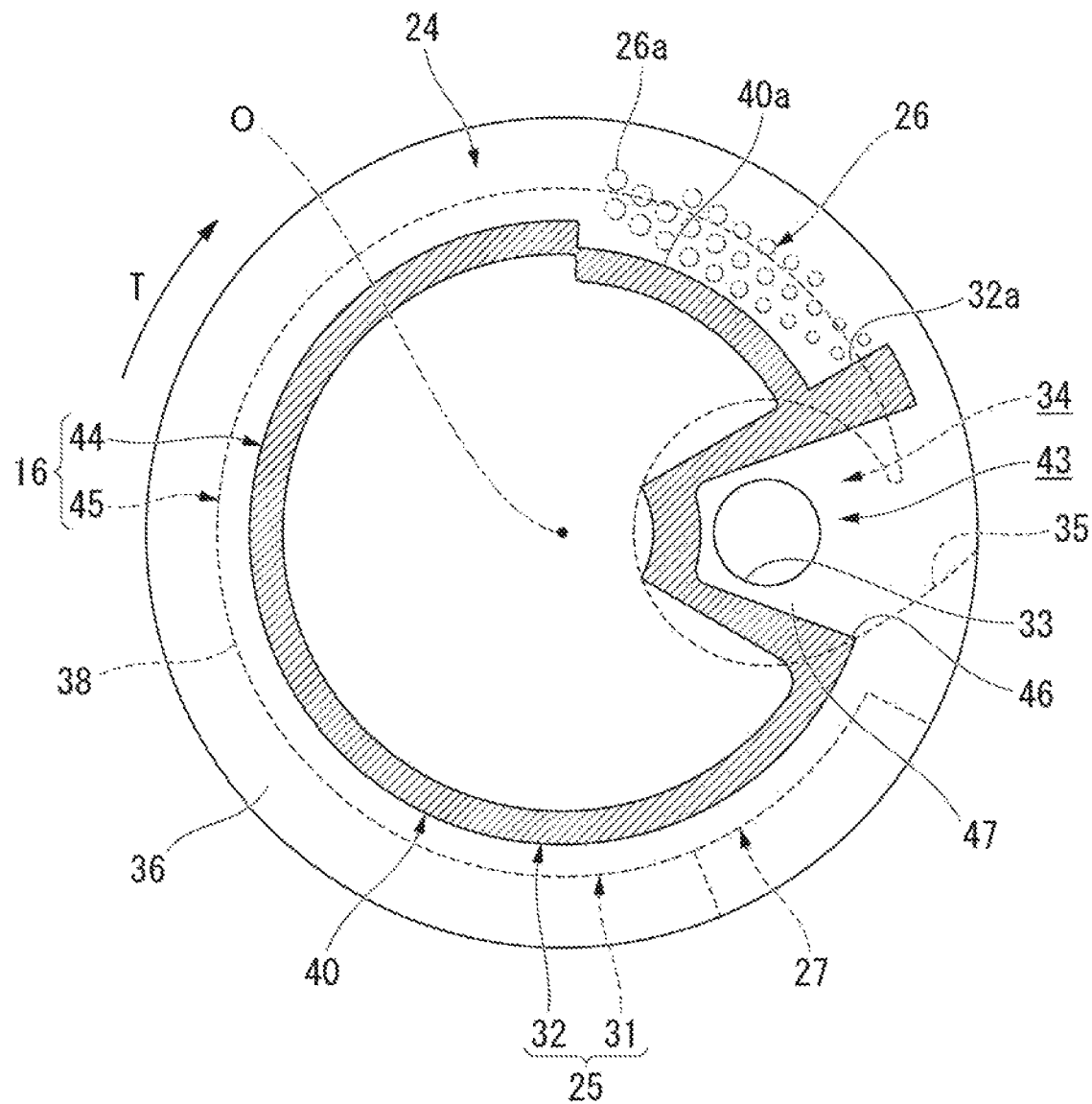
FIG. 2 is a cross-sectional view taken along line A-A of a partition member constituting the vibration-damping device illustrated in FIG. 1.
Figure 3:
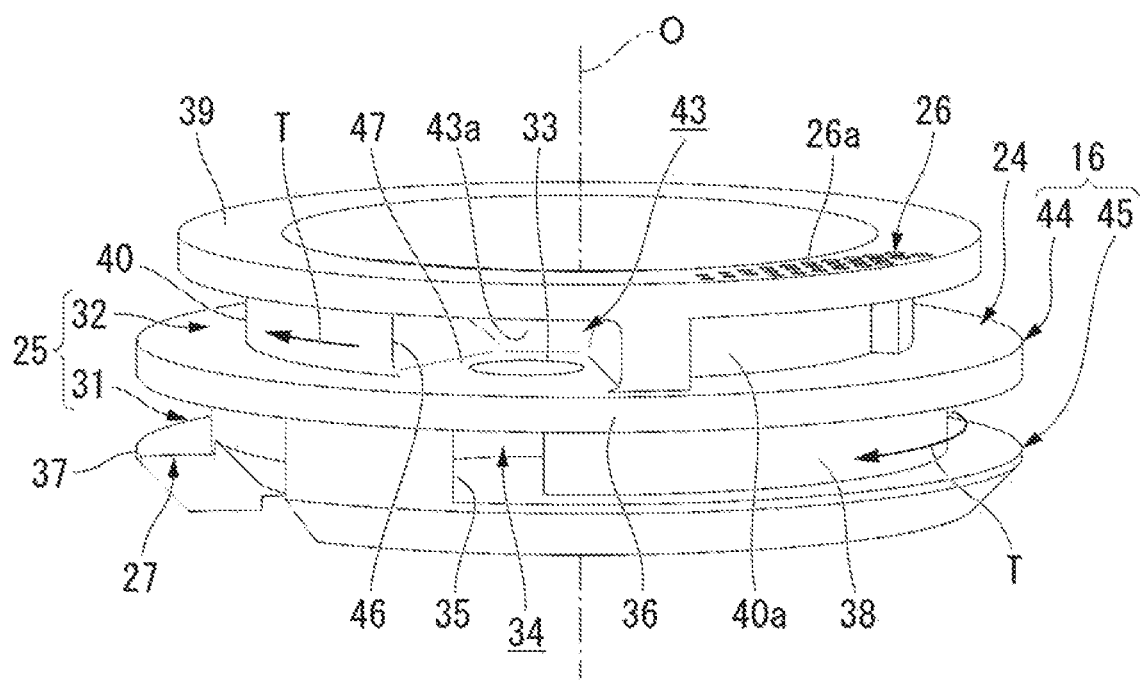
FIG. 3 is a perspective view of the partition member constituting the vibration-damping device illustrated in FIG. 1.

Hereinafter, an embodiment of a vibration-damping device according to the present invention will be described on the basis of FIGS. 1 to 3.

Figure 1:
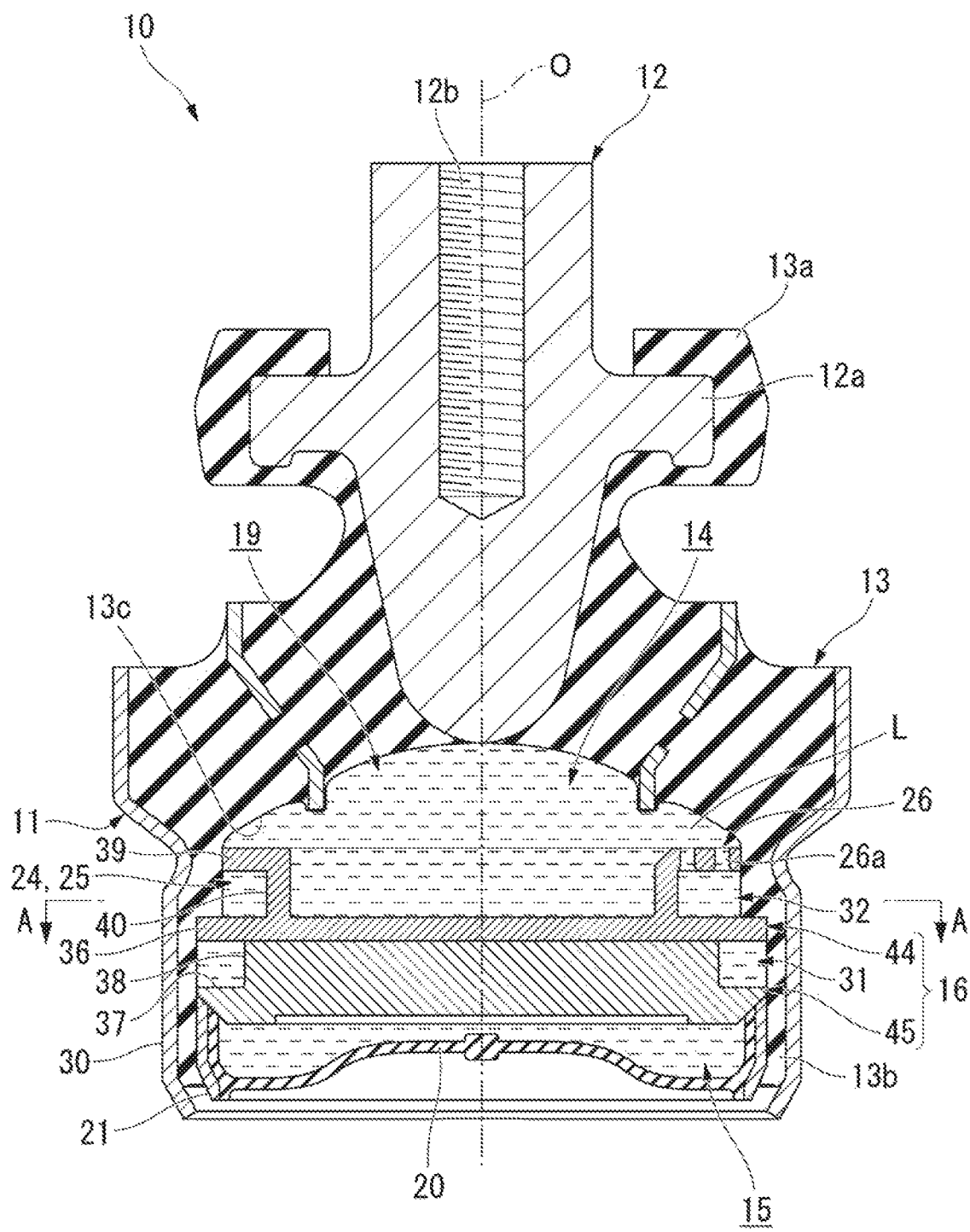
FIG. 1 is a longitudinal sectional view of a vibration-damping device according to one embodiment of the present invention.

As illustrated in FIG. 1, a vibration-damping device 10 is a liquid-sealed type vibration-damping device including a cylindrical first mounting member 11 connected to one of a vibration-generating unit and a vibration-receiving unit, a second mounting member 12 connected to the other of the vibration-generating unit and the vibration-receiving unit, an elastic body 13 elastically connecting the first mounting member 11 and the second mounting member 12 to each other, and a partition member 16 which partitions a liquid chamber 19 in the first mounting member 11 into a main liquid chamber (first liquid chamber) 14 and a sub liquid chamber (second liquid chamber) 15 to be described below.

Hereinafter, a direction along a central axis O of the first mounting member 11 is referred to as an axial direction. Also, the second mounting member 12 side in the axial direction is referred to as an upper side, and the partition member 16 side is referred to as a lower side. Also, in plan view of the vibration-damping device 10 from the axial direction, a direction perpendicular to the central axis O is referred to as a radial direction, and a direction revolving around the central axis O is referred to as a circumferential direction.

Further, the first mounting member 11, the second mounting member 12, and the elastic body 13 are each formed in a circular shape or an annular shape in plan view and disposed coaxially with the central axis O.

When the vibration-damping device 10 is mounted on, for example, an automobile, the second mounting member 12 is connected to an engine serving as a vibration-generating unit, and the first mounting member 11 is connected to the vehicle body serving as a vibration-receiving unit. Thereby, transmission of vibrations from the engine to the vehicle body is suppressed.

The second mounting member 12 is a columnar member extending in the axial direction, has a lower end portion formed in a hemispherical shape that bulges downward, and has a flange part 12a above the hemispherical lower end portion. A screw hole 12b extending downward from an upper end surface thereof is bored through the second mounting member 12, and a bolt (not illustrated) serving as an attachment fitting of the engine side is screwed into the screw hole 12b. The second mounting member 12 is disposed on an upper end opening of the first mounting member 11 with the elastic body 13 therebetween.

The elastic body 13 is a rubber body which is vulcanization-bonded to both the upper end opening of the first mounting member 11 and an outer circumferential surface of a lower portion of the second mounting member 12 to be interposed therebetween and closes the upper end opening of the first mounting member 11 from above. A first rubber film 13a that integrally covers a lower surface, an outer circumferential surface, and an upper surface of the flange part 12a is integrally formed on an upper end portion of the elastic body 13. A second rubber film 13b that covers an inner circumferential surface of the first mounting member 11 in a liquid-tight manner is integrally formed on a lower end portion of the elastic body 13. In addition to the rubber, an elastic body made of a synthetic resin or the like can also be used for the elastic body 13.

The first mounting member 11 is formed in a cylindrical shape and is connected to a vehicle body or the like serving as a vibration-receiving unit by interposing a bracket (not illustrated) therebetween. A lower end opening of the first mounting member 11 is closed by a diaphragm 20.

The diaphragm 20 is made of an elastic material such as a rubber or a soft resin and is formed in a cylindrical shape with a bottom. An outer circumferential surface of the diaphragm 20 is vulcanization-bonded to an inner circumferential surface of a diaphragm ring 21. The diaphragm ring 21 is fitted inside a lower end portion of the first mounting member 11 with the second rubber film 13b interposed therebetween. The diaphragm ring 21 is caulked and fixed inside the lower end portion of the first mounting member 11. Upper end opening edges of the diaphragm 20 and the diaphragm ring 21 are in liquid-tight contact with a lower surface of the partition member 16.

Thus, due to the diaphragm 20 attached to the first mounting member 11 as described above, the inside of the first mounting member 11 forms a liquid chamber 19 sealed in a liquid-tight manner by the elastic body 13 and the diaphragm 20. A liquid L is sealed (filled) in the liquid chamber 19.

Further, in the illustrated example, a bottom portion of the diaphragm 20 has a shape in which an outer circumferential side is deep and a central portion is shallow. However, various conventionally known shapes can be employed for the shape of the diaphragm 20 instead of the shape described above.

The liquid chamber 19 is partitioned into the main liquid chamber 14 and a sub liquid chamber IS by the partition member 16. The main liquid chamber 14 is a space having a lower surface 13c of the elastic body 13 as a portion of a wall surface thereof and surrounded by the second rubber film 13b covering the elastic body 13 and the inner circumferential surface of the first mounting member 11 in a liquid-tight manner and the partition member 16, and an internal volume thereof changes due to deformation of the elastic body 13. The sub liquid chamber 15 is a space surrounded by the diaphragm 20 and the partition member 16, and an internal volume thereof changes due to deformation of the diaphragm 20. The vibration-damping device 10 with such a configuration is a compression type device that is used by being installed such that the main liquid chamber 14 is positioned on the upper side in a vertical direction and the sub liquid chamber 15 is positioned on the lower side in the vertical direction.

The partition member 16 includes a restricted passage 24 that allows the main liquid chamber 14 and the sub liquid chamber 15 to communicate with each other. As illustrated in FIGS. 2 and 3, the restricted passage 24 includes a first communication part 26 that is open to the main liquid chamber 14, a second communication part 27 that is open to the sub liquid chamber 15, and a main body flow path 25 that allows the first communication part 26 and the second communication part 27 to communicate with each other.

The main body flow path 25 extends in the circumferential direction. The main body flow path 25 includes an upper flow path (first main body flow path) 32 connected to the first communication part 26, and a lower flow path (second main body flow path) 31 connected to the second communication part 27 and disposed at a different position in the axial direction with respect to the upper flow path 32. The upper flow path 32 is disposed at an upper portion of the partition member 16, and the lower flow path 31 is disposed at a lower portion of the partition member 16.

The second communication part 27 is open to an end portion on one side in the circumferential direction of the lower flow path 31.

The lower flow path 31 and the upper flow path 32 are formed on an outer circumferential surface of the partition member 16. The lower flow path 31 and the upper flow path 32 are each disposed in the partition member 16 in an angle range of less than 360° around the central axis O. In the illustrated example, the lower flow path 31 and the upper flow path 32 are each disposed in the partition member 16 in an angle range exceeding 180° around the central axis O. Positions in the circumferential, direction of an end portion on the other side in the circumferential direction of the lower flow path 31 and an end portion on one side in the circumferential direction of the upper flow path 32 are the same as each other.

The lower flow path 31 and the upper flow path 32 are disposed coaxially with the central axis O and are axially partitioned by an annular first barrier 36 whose front and rear surfaces face in the axial direction.

The lower flow path 31 is defined by an annular second barrier 37 disposed coaxially with the central axis O, positioned on the lower side thereof, and having front and rear surfaces facing in the axial direction, the above-described first harrier 36 positioned on the upper side thereof, and a lower groove bottom surface 38 connecting inner circumferential edges of the first barrier 36 and the second barrier 37 and facing outward in the radial direction. The second barrier 37 abuts against the sub liquid chamber 15, and the second communication part 27 is constituted by a single opening penetrating the second barrier 37 in the axial direction.

The upper flow path 32 is defined by the above-described first harrier 36 positioned on the lower side thereof, an annular third barrier 39 disposed coaxially with the central axis O, positioned on the upper side thereof, and having front and rear surfaces facing in the axial direction, and a cylindrical upper groove bottom wall 40 connecting inner circumferential edges of the first barrier 36 and the third barrier 39.

The third barrier 39 abuts against the main liquid chamber 14. The outer circumferential surface of the upper groove bottom wall 40 is positioned radially inward from the lower groove bottom surface 38.

An end portion on the other side of the upper flow path 32 in the circumferential direction protrudes radially inward with respect to the other portions. A portion (hereinafter, referred to as a recess) 40a of the upper groove bottom wall 40 that defines the end portion of the other side in the circumferential direction of the upper flow path 32 is positioned racially inward with respect to the other portions.

Among inner surfaces defining the upper flow path 32, an end surface 32a on the other side in the circumferential direction positioned at an end edge of the other side in the circumferential direction and facing one side in the circumferential direction is connected to the end portion on the other side in the circumferential direction of the recess 40a.

The first communication part 26 is formed at a portion of the third barrier 39 which defines the end portion on the other side in the circumferential direction of the upper flow path 32. The first communication part 26 may include a plurality of pores 26a penetrating the third barrier 39 in the axial direction. A lower surface of the third barrier 39 is a flat surface.

When the pores 26a are provided, each of the plurality of pores 26a is smaller than a cross-sectional area of each of the lower flow path 31 and the upper flow path 32, and may be positioned on an inner side of the upper flow path 32 in plan view when viewed from the axial direction. When the pores 26a are provided, an inner diameter of each of the pores 26a may be smaller than an inner diameter of a connection path 33 to be described below. A sum of the opening areas of the plurality of pores 26a may be, for example, 1.5 times or more and 4.0 times or less a minimum value of the flow path cross-sectional area in each of the lower flow path 31 and the upper flow path 32. In the illustrated example, the cross-sectional area of each of the lower flow path 31 and the upper flow path 32 is constant over the entire length. The opening area of the pores 26a may be, for example, 25 mm$^2$ or less, preferably 0.7 mm$^2$ or more and 17 mm$^2$ or less.

When the pores 26a are provided, the plurality of pores 26a may be disposed at intervals in the circumferential direction. In the illustrated example, the plurality of pores 26a are disposed at intervals also in the radial direction. Lengths in the axial direction of the plurality of pores 26a may be the same as one another. In a flow path direction T from the second communication part 27 side toward the first communication part 26 side in the main body flow path 25, the plurality of pores 26a may be formed such that flow resistance of the liquid L becomes higher as the pores 26a are positioned farther from the second communication part 27. In the pores 26a adjacent to each other in the radial direction, the flow resistance of the liquid L may be the same.

In the illustrated example, the plurality of pores 26a are formed such that an inner diameter of the entire region in the central axis direction of the respective pores 26a becomes smaller as the pores 26a are positioned farther from the second communication part 27 in the flow path direction T. Further, the plurality of pores 26a need only be formed such that a minimum value of the inner diameter becomes smaller as the pores 26a are positioned farther from the second communication part 27 in the flow path direction T. Instead of this, for example, the plurality of pores 26a may be formed such that a length in the central axis direction of the respective pores 26a becomes larger as the pores 26a are positioned farther from the second communication part 27 in the flow path direction T, or the like.

Also, in the present embodiment, the main body flow path 25 includes a swirl chamber 34 that generates a swirling flow of the liquid L according to a flow velocity of the liquid L from the other of the first communication part 26 and the second communication part 27. The swirl chamber 34 is disposed to be spaced apart from one of the first communication part 26 and the second communication part 27. Although swirling of the liquid L in the swirl chamber 34 is suppressed when the flow velocity of the liquid L flowing into the swirl chamber 34 is low, a swirling flow of the liquid L is formed in the swirl chamber 34 when the flow velocity of the liquid L is high. The swirling flow swirls around a central axis of the swirl chamber 34.

The swirl chamber 34 is separated from the first communication part 26 by more than 180° in a direction opposite to the flow path direction T around the central axis O. In the illustrated example, the swirl chamber 34 is spaced apart from both the first communication part 26 and the second communication part 27 in the flow path direction T. The swirl chamber 34 generates a swirling flow of the liquid L according to the flow velocity of the liquid L directed from the second communication part 27 to the first communication part 26.

Further, the swirl chamber 34 may be disposed at a connection portion between the lower flow path 31 and the second communication part 27. The swirl chamber 34 may generate a swirling flow of the liquid L according to the flow velocity of the liquid L directed from the first communication part 26 to the second communication part 27. In this case, a plurality of pores may be provided in the second communication part 27, and the swirl chamber 34 may be disposed at a connection portion between the upper flow path 32 and the first communication part 26.

The swirl chamber 34 protrudes radially inward from the lower flow path 31. The swirl chamber 34 is positioned below the upper flow path 32. When the pores 26a are provided, the first communication part 26 including the plurality of pores 26a may be connected to the upper flow path 32 to which the swirl chamber 34 is not connected. The swirl chamber 34 is connected to an end portion on the other side of the lower flow path 31 in the circumferential direction. The inside of the swirl chamber 34 communicates with the inside of the lower flow path 31 through a rectifying path 35. The swirl chamber 34 forms a swirling flow of the liquid L according to the flow velocity of the liquid L introduced from the rectifying path 35.

The swirl chamber 34 has a circular shape in plan view when viewed in the axial direction, and the central axis of the swirl chamber 34 extends in the axial direction. The swirl chamber 34 is positioned radially inward from the lower groove bottom surface 38. Among wall surfaces defining the swirl chamber 34, both an upper wall surface positioned on the upper side and facing downward and a lower wall surface positioned on the lower side and facing upward are flat surfaces extending in a direction perpendicular to the axial direction.

The rectifying path 35 extends linearly in plan view. The rectifying path 35 extends in a tangential direction of an inner circumferential surface of the swirl chamber 34 in plan view. A size of the rectifying path 35 in the circumferential direction is smaller than an inner diameter of the swirl chamber 34. Sizes of the rectifying path 35 and the swirl chamber 34 in the axial direction are the same as each other. The liquid L introduced from the rectifying path 35 into the swirl chamber 34 swirls by flowing along the inner circumferential surface of the swirl chamber 34 after flowing through the rectifying path 35 and being rectified in the tangential direction.

A diffusion chamber 43 that is axially continuous with the swirl chamber 34 through the connection path 33 is disposed in the other of the lower flow path 31 and the upper flow path 32.

The diffusion chamber 43 protrudes radially inward from the upper flow path 32. The diffusion chamber 43 is positioned above the lower flow path 31. The diffusion chamber 43 is connected to the end portion on one side of the upper flow path 32 in the circumferential direction. The inside of the diffusion chamber 43 communicates with the inside of the upper flow path 32 through an opening 46 from the outside in the radial direction. A circumferential length of the opening 46 is the same as a circumferential length of an outer end portion in the radial direction of the diffusion chamber 43. The opening 46 is disposed over the entire region at the outer end portion in the radial direction of the diffusion chamber 43.

The diffusion chamber 43 has a rectangular shape in which a length in the circumferential direction decreases gradually from the outside toward the inside in the radial direction in plan view from the axial direction. Among wall surfaces defining the diffusion chamber 43, a pair of side wall surfaces facing each other in the circumferential direction extend gradually toward each other from the outside to the inside in the radial direction, an upper wall surface (facing surface) 43a positioned on the upper side and facing downward gradually extends downward from the outside toward the inside in the radial direction, and a lower wall surface positioned on the lower side and facing upward is a flat surface extending in a direction perpendicular to the axial direction.

Here, the diffusion chamber 43 and the swirl chamber 34 are axially adjacent to each other and are axially partitioned by a fourth barrier 47 whose front and rear surfaces face in the axial direction. A lower surface of the fourth barrier 47 is the upper wall surface of the swirl chamber 34, and an upper surface thereof is the lower wall surface of the diffusion chamber 43. The fourth barrier 47 protrudes radially inward from an inner circumferential edge of the first barrier 36. The front and rear surfaces of each of the fourth barrier 47 and the first barrier 36 are continuous with each other without any step.

The connection path 33 axially penetrates through the fourth barrier 47 and allows the swirl chamber 34 and the diffusion chamber 43 to communicate with each other in the axial direction. The connection path 33 faces the lower wall surface of the swirl chamber 34 and the upper wall surface 43a of the diffusion chamber 43 in the axial direction. The connection path 33 has a circular shape when viewed in the axial direction and is disposed coaxially with the central axis of the swirl chamber 34. The connection path 33 is positioned inside the swirl chamber 34 and the diffusion chamber 43 in plan view. A center of the connection path 33 is positioned radially inward from a central portion in the radial direction of the diffusion chamber 43.

In the configuration described above, when the flow velocity of the liquid L flowing in the lower flow path 31 from the second communication part 27 side to the first communication part 26 side and introduced into the swirl chamber 34 through the rectifying path 35 is high, a swirling flow of the liquid L is formed in the swirl chamber 34. Thereafter, the liquid L having been introduced into the diffusion chamber 43 through the connection path 33 collides with the upper wall surface 43a, diffuses in the diffusion chamber 43, and then is introduced into the upper flow path 32 through the opening 46 and flows toward the first communication part 26.

Here, the partition member 16 is configured such that the upper member 44 and the lower member 45 are stacked in the axial direction. The upper member 44 is formed in a cylindrical shape with a flat bottom, and the lower member 45 is formed in a plate shape. Further, the partition member 16 may be integrally formed in its entirety. In the upper member 44, the upper flow path 32 is formed on an outer circumferential surface of the circumferential wall, and the connection path 33 positioned radially inward from the upper flow path 32 is formed on a bottom wall thereof. That is, the fourth barrier 47 is a portion of the bottom wall of the upper member 44. A lower surface of the bottom wall of the upper member 44 is a flat surface extending in a direction perpendicular to the axial direction over the entire region. The first barrier 36 is a portion of the circumferential wall of the upper member 44 and is an annular wall surface having a surface positioned on the lower side and facing upward among the inner surfaces defining the upper flow path 32. The opening 46 penetrates into the circumferential wall of the upper member 44 in the radial direction, and the pair of side wall surfaces and the upper wall surface 43a which define the diffusion chamber 43 protrude radially inward from a circumferential edge portion of the opening 46 on an inner circumferential surface of the circumferential wall of the upper member 44.

An outer circumferential surface of the lower member 45 is the lower groove bottom surface 38. A recess defining the swirl chamber 34 and the rectifying path 35 is formed between an upper surface of the lower member 45 and the lower surface of the bottom wall of the upper member 44. A portion of the recess that defines the rectifying path 35 is open to the outer circumferential surface of the lower member 45.

The annular second barrier 37 protruding toward a radially outward side and facing the first barrier 36 in the axial direction is formed on an outer circumferential surface of a lower end portion of the lower member 45.

In the vibration-damping device 10 with such a configuration, the mounting members 11 and 12 are displaced relative to each other while elastically deforming the elastic body 13 at the time of vibration input. Then, a liquid pressure in the main liquid chamber 14 changes, the liquid L in the main liquid chamber 14 is introduced into the sub liquid chamber 15 through the restricted passage 24, and the liquid L in the sub liquid chamber 15 is introduced into the main liquid chamber 14 through the restricted passage 24.

According to the vibration-damping device 10 of the present embodiment, in a case in which a large load (vibration) is input, when the liquid L is introduced into the swirl chamber 34 from the second communication part 27 side, and when the flow velocity of the liquid L is sufficiently high and a swirling flow of the liquid L is formed in the swirl chamber 34, a pressure loss of the liquid L can be increased due to, for example, an energy loss by the formation of the swirling flow, an energy loss by friction between the liquid L and an inner surface of the swirl chamber 34, and the like.

Further, in a case in which the pores 26a are provided, when the liquid L flows out of the restricted passage 24 into the main liquid chamber 14 through the plurality of pores 26a, since the liquid L flows through each of the pores 26a while being subjected to a pressure loss by the third barrier 39 in which these pores 26a are formed, the flow velocity of the liquid L introduced into the main liquid chamber 14 can be reduced. In addition, since the liquid L flows through the plurality of pores 26a instead of a single pore 26a, the liquid L can be caused to flow by being branched off into a plurality of portions, and thus the flow velocity of the liquid L that has passed through the individual pores 26a can be reduced. Thereby, even when a large load (vibration) is input to the vibration-damping device 10, a difference in flow velocity generated between the liquid L that has passed through the pores 26a and flowed into the main liquid chamber 14 and the liquid L in the main liquid chamber 14 can be reduced to be small, and thus generation of swirl due to the difference in flow velocity and generation of bubbles due to the swirl can be reduced. Also, even if bubbles are generated in the restricted passage 24 instead of the main liquid chamber 14, by causing the liquid L to pass through the plurality of pores 26a, the generated bubbles can be separated in the main liquid chamber 14, merging and growing of the bubbles are suppressed, and thereby the bubbles can be easily maintained in a finely dispersed state.

As described above, in addition to suppressing the generation of bubbles, even when bubbles are generated, since the bubbles can be easily maintained in a finely dispersed state, even if cavitation collapse in which bubbles collapse occurs, generated abnormal noise can be reduced to be small.

Particularly, since the swirl chamber 34 is disposed at a portion of the main body flow path 25 separated from the first communication part 26, the flow velocity of the liquid L can be reduced by causing the liquid L to pass through the swirl chamber 34 before reaching the first communication part 26 from the main body flow path 25. Also, when the pores 26a are provided, since the flow velocity of the liquid L introduced into the main liquid chamber 14 from each of the pores 26a can be reliably reduced and the liquid L can be easily spread over the entire region of the first communication part 26, the flow velocity of the liquid L passing through the first communication part 26 can be reliably reduced.

Also, when the pores 26a are provided, since the plurality of pores 26a are formed such that the flow resistance of the liquid L becomes higher as the pores 26a are positioned farther from the second communication part 27 in the flow path direction T from the second communication part 27 side to the first communication part 26 side in the main body flow path 25, when the liquid L flowing in the main body flow path 25 reaches the first communication part 26, the liquid L passing through the pores 26a positioned on the second communication part 27 side among the plurality of pores 26a by an inertia force can be suppressed. Thereby, introducing the liquid L from the main body flow path 25 into the pores 26a positioned on the second communication part 27 side also is facilitated, the flow velocities of the liquid L introduced from each of the pores 26a into the main liquid chamber 14 are made uniform, and thus the flow velocity becoming locally high can be suppressed. Accordingly, generation of abnormal noise clue to the generation of bubbles and the cavitation collapse can be more effectively suppressed.

Also, since the swirl chamber 34 is connected to the lower flow path 31 and not connected to both the lower flow path 31 and the upper flow path 32, a space at a portion positioned radially inward from the upper flow path 32 can be secured in the partition member 16.

Further, when the pores 26a are provided, since the first communication part 26 having the plurality of pores 26a is connected to the upper flow path 32 to which the swirl chamber 34 is not connected, a long distance in the flow path direction T from the swirl chamber 34 to the pores 26a can be secured, and thus the flow velocity of the liquid L, passing through the first communication part 26 can be more reliably reduced.

Also, since the diffusion chamber 43 that is axially continuous with the swirl chamber 34 through the connection path 33 is disposed in the upper flow path 32 to which the swirl chamber 34 is not connected, when the liquid L that has swirled in the swirl chamber 34 is introduced into the diffusion chamber 43 through the connection path 33, the liquid L collides with the facing surface 43a of the diffusion chamber 43 and diffuses in the diffusion chamber 43, and thereby the pressure loss of the liquid L can be reliably increased.

Further, the technical scope of the present invention is not limited to the above-described embodiment, and various modifications can be made without departing from the gist of the present invention.

For example, when the pores 26a are provided, only the second communication part 27 may have a plurality of pores, or both the first communication part 26 and the second communication part 27 may have a plurality of pores.

Also, although a configuration in which, when the pores 26a are provided, the plurality of pores 26a are formed such that the flow resistance of the liquid L becomes higher as the pores 26a are positioned farther from the second communication part 27 in the flow path direction T has been described, the present invention is not limited thereto and may be changed as appropriate, for example, such as the flow resistances of all the pores 26a being made uniform.

Also, when the pores 26a are provided, both the first communication part 26 including the plurality of pores 26a and the swirl chamber 34 may be disposed in any one of the upper flow path 32 and the lower flow path 31.

Further, the shape and size of the diffusion chamber 43 may be changed as appropriate, and a main body flow path 25 not having the diffusion chamber 43 may be employed.

In addition, the swirl chamber 34 and the diffusion chamber 43 may be disposed at an intermediate position in the circumferential direction of the upper flow path 32 or the lower flow path 31.

Also, although a configuration in which the upper flow path 32 and the lower flow path 31 are provided as the main body flow path 25 to make the partition member 16 go round about twice has been described, a configuration in which the partition member 16 goes round once or three times or more may be employed.

Further, the main body flow path 25 may be appropriately changed, for example, such as extending in the axial direction.

Also, in the above-described embodiment, although the vibration-damping device 10 of the compression type in which a positive pressure acts on the main liquid chamber 14 when a support load acts thereon has been described, the present invention is also applicable to a vibration-damping device of a suspension type which is installed such that the main liquid chamber 14 is positioned on a lower side in the vertical direction and the sub liquid chamber 15 is positioned on an upper side in the vertical direction and in which a negative pressure acts on the main liquid chamber 14 when a support load acts thereon.

In the above-described embodiment, the partition member 16 partitions the liquid chamber 19 in the first mounting member 11 into the main liquid chamber 14 having the elastic body 13 as a portion of the wall surface thereof and the sub liquid chamber 15, but the present invention is not limited thereto. For example, instead of providing the diaphragm 20, a pair of elastic bodies 13 may be provided in the axial direction, and instead of providing the sub liquid chamber 15, a pressure-receiving liquid chamber having the elastic body 13 as a portion of a wall surface thereof may be provided. For example, the present invention can be appropriately changed to another configuration in which the partition member 16 partitions the liquid chamber 19 in the first mounting member 11 in which the liquid is sealed into the first liquid chamber 14 and the second liquid chamber 15, and at least one of the two liquid chambers of the first liquid chamber 14 and the second liquid chamber 15 has the elastic body 13 as a portion of the wall surface thereof.

Also, the vibration-damping device 10 according to the present invention is not limited to the engine mount of vehicles and may also be applied to mounts other than the engine mount. For example, the present invention can also be applied to a generator mount mounted on a construction machine, or to a machine mount installed in a factory or the like.

In addition, the components in the above-described embodiments can be appropriately replaced with well-known components without departing from the spirit and scope of the present invention, and furthermore, the above-described modified examples may be appropriately combined.

According to the present invention, at the time of vibration input, the mounting members are displaced relative to each other while elastically deforming the elastic body, and liquid pressures in the first liquid chamber and the second liquid chamber change to cause the liquid to flow between the first liquid chamber and the second liquid chamber through the restricted passage. At this time, the liquid is introduced into the restricted passage through one of the first communication part and the second communication part, passes through the main body flow path, and then flows out of the restricted passage through the other of the first communication part and the second communication part.

Here, in a case in which a large load (vibration) is input to the vibration-damping device, when the liquid is introduced into the swirl chamber from the other of the first communication part and the second communication part, and when the flow velocity of the liquid is sufficiently high and a swirling flow of the liquid is formed in the swirl chamber, the pressure loss of the liquid can be increased due to, for example, an energy loss by the formation of the swirling flow, an energy loss by friction between the liquid and the inner surface of the swirl chamber, and the like. Further, in a case in which the pores are provided, when the liquid flows out of the restricted passage into the first liquid chamber or the second liquid chamber through the plurality of pores, since the liquid flows through each of the pores while being subjected to a pressure loss by the barrier in which the pores are formed, the flow velocity of the liquid introduced into the first liquid chamber or the second liquid chamber can be reduced. In addition, when the pores are provided, since the liquid flows through the plurality of pores instead of a single pore, the liquid can be caused to flow by being branched off into a plurality of portions, and thus the flow velocity of the liquid that has passed through the individual pores can be reduced. Thereby, even when a large load (vibration) is input to the vibration-damping device, a difference in flow velocity generated between the liquid that has passed through the pores and introduced into the first liquid chamber or the second liquid chamber and the liquid in the first liquid chamber or the second liquid chamber can be reduced to be small, and thus generation of swirl due to the difference in flow velocity and generation of bubbles due to the swirl can be reduced. Also, even if bubbles are generated in the restricted passage instead of the first liquid chamber or the second liquid chamber, by causing the liquid to pass through the plurality of pores, the generated bubbles can be separated in the first liquid chamber or in the second liquid chamber, merging and growing of the bubbles are suppressed, and thereby the bubbles can be easily maintained in a finely dispersed state.

As described above, in addition to suppressing the generation of bubbles, even when bubbles are generated, since the bubbles can be easily maintained in a finely dispersed state, even if cavitation collapse in which bubbles collapse occurs, generated abnormal noise can be reduced to be small.

Particularly, since the swirl chamber is disposed at a portion of the main body flow path separated from one of the first communication part or the second communication part, the flow velocity of the liquid can be reduced by causing the liquid to pass through the swirl chamber before reaching one of the first communication part or the second communication part from the main body flow path.

Also, when the pores are provided, the flow velocity of the liquid introduced into the first liquid chamber or the second liquid chamber from each of the pores can be reliably reduced, and the liquid can be easily spread over the entire region of one of the first communication part and the second communication part and thus the flow velocity of the liquid passing through the communication part can be reliably reduced.

Also, when the pores are provided, the plurality of pores may be disposed at intervals in the flow path direction of the main body flow path, and flow resistance of the liquid may become higher as the pores are positioned farther from the other side in the flow path direction from the other side of the first communication part and the second communication part to one side thereof in the main body flow path.

In this case, when the liquid flowing in the main body flow path reaches one of the first communication part and the second communication part, the liquid passing through the pores positioned on the other side of the first communication part and the second communication part among the plurality of pores by an inertial force can be suppressed. Thereby, introducing the liquid from the main body flow path into the pores positioned on the other side also is facilitated, the flow velocities of the liquid introduced from each of the pores into the first liquid chamber or the second liquid chamber are made uniform, and thus the flow velocity becoming locally high can be suppressed. Accordingly, generation of abnormal noise due to the generation of bubbles and the cavitation collapse can be more effectively suppressed.

Also, the main body flow path may extend in the circumferential direction around the central axis of the first mounting member and may include the first main body flow path connected to the first communication part, and the second main body flow path connected to the second communication part and disposed at a different position in the axial direction along the central axis with respect to the first main body flow path, and the swirl chamber may protrude radially inward from one of the first main body flow path and the second main body flow path.

In this case, since the swirl chamber is connected to one of the first main body flow path and the second main body flow path and not connected to both the first main body flow path and the second main body flow path, a space at a portion positioned radially inward from the other of the first main body flow path and the second main body flow path can be secured in the partition member.

In this configuration, one of the first communication part and the second communication part including the plurality of pores may be connected to the other of the first main body flow path and the second main body flow path.

In this case, a long distance in the flow path direction from the swirl chamber to the pores can be secured, and the flow velocity of the liquid passing through one of the first communication part and the second communication part can be more reliably reduced.

Also, the central axis of the swirl chamber extends in the axial direction, the diffusion chamber that is axially continuous with the swirl chamber through the connection path is disposed in the other of the first main body flow path and the second main body flow path, and the diffusion chamber may include a facing surface facing the connection path in the axial direction.

In this case, since the diffusion chamber that is axially continuous with the swirl chamber through the connection path is disposed in the other of the first main body flow path and the second main body flow path in which the swirl chamber is not disposed, when the liquid that has swirled in the swirl chamber is introduced into the diffusion chamber through the connection path, the liquid collides with the facing surface of the diffusion chamber and diffuses in the diffusion chamber, and thereby the pressure loss of the liquid can be reliably increased.

INDUSTRIAL APPLICABILITY

According to the present invention, generation of abnormal noise due to cavitation collapse can be suppressed with a simple structure without vibration-damping characteristics deteriorating.

REFERENCE SIGNS LIST

10 Vibration-damping device
11 First mounting member
12 Second mounting member
13 Elastic body
14 Main liquid chamber (first liquid chamber)
15 Sub liquid chamber (second liquid chamber)
16 Partition member
19 Liquid chamber
24 Restricted passage
25 Main body flow path
26 First communication part
26a Pores
27 Second communication part
31 Lower flow path (second main body flow path)
32 Upper flow path (first main body flow path)
33 Connection path
34 Swirl chamber
37 Second barrier
39 Third barrier
43 Diffusion chamber
43a Upper wall surface (facing surface)
L Liquid
O Central axis
T Flow path direction

The invention claimed is:

1. A vibration-damping device of a liquid-sealed type, comprising:
a cylindrical first mounting member connected to one of a vibration-generating unit and a vibration-receiving unit and a second mounting member connected to the other thereof;
an elastic body elastically connecting the first and second mounting members; and
a partition member which partitions a liquid chamber in the first mounting member in which a liquid is sealed into a first liquid chamber and a second liquid chamber, wherein
a restricted passage is formed in the partition member to allow the first liquid chamber and the second liquid chamber to communicate with each other,
the restricted passage includes:
a first communication part which is open to the first liquid chamber;
a second communication part which is open to the second liquid chamber; and
a main body flow path which allows the first communication part and the second communication part to communicate with each other,
the main body flow path includes a swirl chamber that generates a swirling flow of the liquid according to a flow velocity of the liquid from the other of the first communication part and the second communication part, and
the swirl chamber is disposed to be spaced apart from both of the first communication part and the second communication part,
the main body flow path includes:
a first main body flow path connected to the first communication part; and
a second main body flow path connected to the second communication part, and disposed such that a position of the second main body flow path in an axial direction is different from a position of the first main body flow path in the axial direction, the axial direction being a direction along the central axis,
at least a part of the first main body flow path overlaps the second main body flow path when viewed in the axial direction, the first main body flow path extends in a circumferential direction around a central axis of the first mounting member, and a first end portion in the circumferential direction of the first main body flow path is connected to the first communication part, the second main body flow path extends in the circumferential direction, and a first end portion in the circumferential direction of the second main body flow path is connected to the second communication part, the swirl chamber, the first main body flow path, and the second main body flow path are separately formed, and the swirl chamber is connected to a second end portion in the circumferential direction of one of the first main body flow path and the second main body flow path, and protrudes radially inward from the second end portion in the circumferential direction of the one of the first main body flow path and the second main body flow path wherein the first main body flow path and the second main body flow path are each disposed in the partition member in an angle range of less than 360° around the central axis.

2. The vibration-damping device according to claim 1, wherein
   a central axis of the swirl chamber extends in the axial direction,
   a diffusion chamber which is axially continuous with the swirl chamber through a connection path is disposed in another of the first main body flow path and the second main body flow path, and
   the diffusion chamber includes a facing surface facing the connection path in the axial direction.

3. The vibration-damping device according to claim 1, wherein the partition member includes an annular first barrier, wherein first main flow path and the second main flow path are axially partitioned by the annular first barrier.

4. The vibration-damping device according to claim 3, further comprising an annular second barrier, wherein the annular second barrier defines one of the first main flow path and the second main flow path.

5. The vibration-damping device according to claim 4, further comprising an annular third barrier, wherein the annular third barrier defines another of the first main flow path and the second main flow path.

* * * * *